(12) United States Patent
Wang et al.

(10) Patent No.: US 9,928,412 B2
(45) Date of Patent: Mar. 27, 2018

(54) METHOD, MEDIUM, AND SYSTEM FOR FAST 3D MODEL FITTING AND ANTHROPOMETRICS

(71) Applicant: eBay Inc., San Jose, CA (US)

(72) Inventors: Qiaosong Wang, Newark, DE (US); Robinson Piramuthu, Oakland, CA (US); Vignesh Jagadeesh, Santa Clara, CA (US); Bryan Kent Ressler, Sammamish, WA (US)

(73) Assignee: eBay Inc., San Jose, CA (US)

( * ) Notice: Subject to any disclaimer, the term of this patent is extended or adjusted under 35 U.S.C. 154(b) by 335 days.

(21) Appl. No.: 14/883,419

(22) Filed: Oct. 14, 2015

(65) Prior Publication Data

US 2016/0110595 A1 Apr. 21, 2016

Related U.S. Application Data

(60) Provisional application No. 62/065,163, filed on Oct. 17, 2014.

(51) Int. Cl.
*G06Q 30/00* (2012.01)
*G06K 9/00* (2006.01)
(Continued)

(52) U.S. Cl.
CPC ........... *G06K 9/00375* (2013.01); *G06K 9/52* (2013.01); *G06K 9/6201* (2013.01);
(Continued)

(58) Field of Classification Search
CPC .... G06K 9/00375; G06K 9/52; G06K 9/6201; G06K 9/00362; G06K 9/00369;
(Continued)

(56) References Cited

U.S. PATENT DOCUMENTS

| 2010/0111370 A1* | 5/2010 | Black | G06K 9/00369 |
| | | | 382/111 |
| 2011/0246329 A1 | 10/2011 | Geisner et al. | |
| 2014/0226000 A1* | 8/2014 | Vilcovsky | G06F 3/017 |
| | | | 348/77 |

FOREIGN PATENT DOCUMENTS

WO WO-2016061341 A1 4/2016

OTHER PUBLICATIONS

Kalantidis, Yannis, Lyndon Kennedy, and Li-Jia Li. "Getting the look: clothing recognition and segmentation for automatic product suggestions in everyday photos." Proceedings of the 3rd ACM conference on International conference on multimedia retrieval. ACM , 2013. (Year: 2013).*

(Continued)

*Primary Examiner* — Matthew E Zimmerman
(74) *Attorney, Agent, or Firm* — Schwegman Lundberg & Woessner, P.A.

(57) ABSTRACT

A large synthetic 3D human body model dataset using real-world body size distributions is created. The model dataset may follow real-world body parameter distributions. Depth sensors can be integrated into mobile devices such as tablets, cellphones, and wearable devices. Body measurements for a user are extracted from a single frontal-view depth map using joint location information. Estimates of body measurements are combined with local geometry features around joint locations to form a robust multi-dimensional feature vector. A fast nearest-neighbor search is performed using the feature vector for the user and the feature vectors for the synthetic models to identify the closest match. The retrieved model can be used in various applications such as clothes shopping, virtual reality, online gaming, and others.

18 Claims, 10 Drawing Sheets

(51) Int. Cl.
  *G06K 9/52* (2006.01)
  *G06K 9/62* (2006.01)
  *G06Q 30/06* (2012.01)
  *G06T 7/60* (2017.01)
  *A41H 1/02* (2006.01)

(52) U.S. Cl.
  CPC ........... *G06Q 30/0643* (2013.01); *G06T 7/60* (2013.01); *A41H 1/02* (2013.01); *G06K 9/00362* (2013.01); *G06T 2207/10028* (2013.01); *G06T 2207/30196* (2013.01); *G06T 2210/16* (2013.01)

(58) Field of Classification Search
  CPC ......... G06Q 30/0643; G06T 7/60; G06T 7/75; G06T 2207/10028; G06T 2207/30196; G06T 2207/16; G06T 11/00; G06T 17/00; A41H 1/02; A47F 2007/195; G06F 3/011; H04N 1/387; H04N 2005/2726
  See application file for complete search history.

(56) References Cited

OTHER PUBLICATIONS

"European Application Serial No. 15 851 370.5, Response to Communication pursuant to (Rules 161(1) and 162 EPC dated Jun. 7, 2017", 12 pgs.

"International Application Serial No. PCT/US2015/055723, Written Opinion dated Jan. 8, 2016", 5 pgs.

"International Application Serial No. PCT/US2015/055723, International Search Report dated Jan. 8, 2016", 2 pgs.

Agarwal, Ankur, et al., "3D Human Pose from Silhouettes by Relevance Vector Regression", CVPR '04, [Online]. Retrieved from the Internet: <URL: http://ieeexplore.ieee.org/xpls/abs all. jsp?arnumber=1315258>, (Jun. 2004), 882-888.

Bogo, Federica, et al., "Faust: Dataset and evaluation for 3D mesh registration". CVPR, (2014), 3794-3801.

Hasler, N, et al., "A Statistical Model of Human Pose and Body Shape", Eurographics, vol. 28, No. 2, (2009), 10 pgs.

Lee, Yongjoon, et al., "Automatic pose-independent 3D garment fitting", Computers & Graphics 37, (2013), 911-922.

Li, Jituo, et al., "Fitting 3D garment models onto individual human models", Computers & Graphics 34(6), [Online]. Retrieved from the Internet: <URL: https://www.researchgate.net/publication/220252223_Fitting_3D_garment_models_onto_individual_human_models>, (Dec. 2010), 742-755.

Rusu, Radu, et al., "Fast Point Feature Histograms (FPFH) for 3D Registration", Robotics and Automation, (May 2009), 3212-3217.

Tong, Jing, et al., "Scanning 3D Full Human Bodies Using Kinects", IEEE Transactions on Visualization and Computer Graphics, vol. 18, No. 4,, (Apr. 2012), 643-650.

Van Deun, Dorien, et al., "Automatic Generation of Personalized Human Models based on Body Measurements", International Symposium on Digital Human Modeling, (2011), 5 pgs.

* cited by examiner

← 900

910

| User ID | Height | Weight | Gender | Model ID |

920

| Model ID | Height | Weight | Gender | 3D Model Data |

930

| Item ID | Image 1 | Image 2 | Description | 3D Model Data |

*FIG. 9*

METHOD, MEDIUM, AND SYSTEM FOR FAST 3D MODEL FITTING AND ANTHROPOMETRICS

PRIORITY CLAIM

This application claims the benefit of U.S. Provisional Patent Application No. 62/065,163, entitled "Fast 3D Model Fitting and Anthropometrics using Synthetic Data," filed on Oct. 17, 2014, which is hereby incorporated herein by reference in its entirety.

TECHNICAL FIELD

The subject matter disclosed herein generally relates to the use of sensor data to select three-dimensional ("3D") models that represent sensed objects. Specifically, the present disclosure addresses systems and methods related to the generation of a set of 3D models and matching a sensed object to one or more of the models in the set based on sensor data.

BACKGROUND

An electronic marketplace provides the ability for users to buy and sell items electronically, including clothing. Different clothing manufacturers use different sizing standards. Accordingly, when a user orders clothes, they may or may not fit properly. A user can return ordered items and exchange them, with some hassle or expense.

A 3D photographing system can take images of an individual from a number of angles, either by using multiple cameras or by taking sequential images and moving the individual or the camera between photos. Based on the images, a 3D model of the individual can be generated. Generating the images includes some risk of loss of privacy for the individual.

BRIEF DESCRIPTION OF THE DRAWINGS

Some embodiments are illustrated, by way of example and not limitation, in the figures of the accompanying drawings.

FIG. 9 is a block diagram illustrating database structures for fast 3D model fitting and anthropometrics using synthetic data, according to some example embodiments.

DETAILED DESCRIPTION

Figure 1:
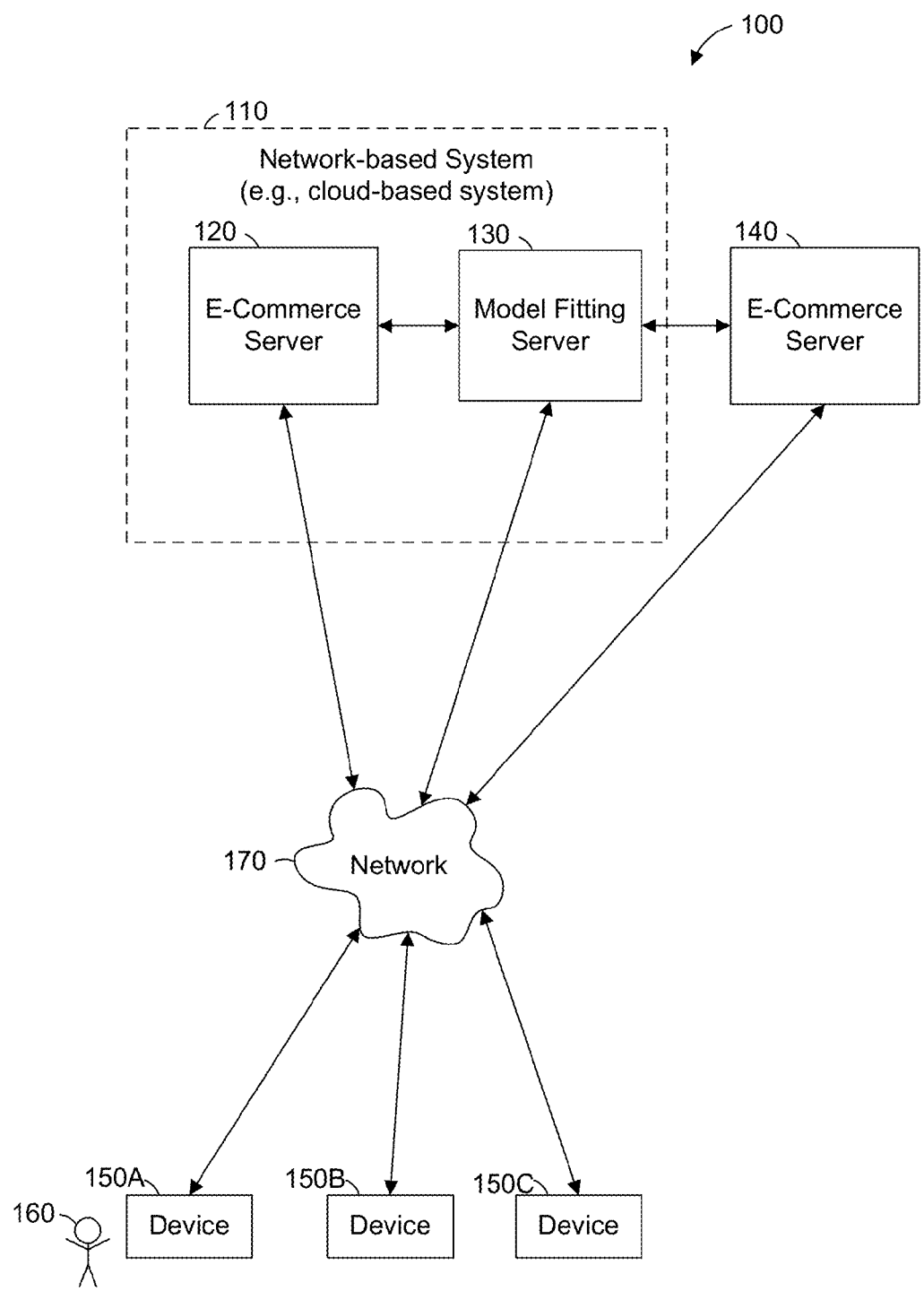
FIG. 1 is a network diagram illustrating a network environment suitable for fast 3D model fitting and anthropometrics using synthetic data, according to some example embodiments.

The description that follows includes systems, methods, techniques, instruction sequences, and computing machine programs that embody illustrative embodiments of this disclosure regarding fast 3D model fitting and anthropometrics using synthetic data. In the following description, for purposes of explanation, numerous specific details are set forth to provide a thorough understanding of example embodiments. It will be evident to one skilled in the art, however, that embodiments of the inventive subject matter may be practiced without these specific details. In general, well-known instruction instances, protocols, structures, and techniques are not necessarily shown in detail.

Recently, consumer grade depth cameras have proven practical and quickly progressed into markets. These sensors cost around $200 and can be used conveniently in a living room. Depth sensors can also be integrated into mobile devices such as tablets, cellphones, and wearable devices. Thus, depth data can be obtained from average users and accurate measurements can be estimated. However, it is challenging to produce high-quality 3D human body models, since such sensors only provide a low-resolution depth map (typically 320×240 pixels) with a high noise level.

This challenge is addressed by creating a large synthetic 3D human body model dataset using real-world body size distributions. The model dataset may follow real-world body parameter distributions. For example, the height and weight distributions of men and women in various age groups are known to a higher degree of accuracy than the distribution of body shapes. By generating models having various body shapes that correspond to the known heights and weights, in the same frequency distribution as the actual population, the quality of the potential matches is increased over a random model distribution.

Body measurements for a user are extracted from a depth map using joint location information. The joint locations may correspond to actual joints (e.g., the ankle joint, wrist joint, and elbow joint) or to other important body locations (e.g., the head joint and the torso joint). A single frontal-view depth map can be used, or multiple views can be used. Additional depth maps of the user taken from different directions can improve the accuracy of the estimation of the model for the user. In one example embodiment, OpenNI from the Open Natural Interaction group is used to report the joint location information. Estimates of body measurements are combined with local geometry features around joint locations to form a robust multi-dimensional feature vector. A fast nearest-neighbor search is performed using the feature vector for the user and the feature vectors for the synthetic models to identify the closest match. The retrieved 3D model may be fully parameterized and rigged, which enables the generation of data such as standard full body measurements, labeled body parts, and so on. Rigging includes information such as a joint hierarchy and degrees of freedom and constraints on the joints. Through the use of the rigging data, the model can be posed and animated in realistic ways.

The retrieved 3D model can be animated by mapping the skeleton of the model to joints (e.g., joints provided by Microsoft Kinect™ or other sources). Based on shape and pose parameters describing the body, a garment can be fitted to the model with realistic wrinkles (e.g., as described in Li J. et al, *Fitting 3D garment models onto individual human models*, COMPUTERS AND GRAPHICS, December 2010). In some example embodiments, relatively simple features of the user's body are calculated from the input data, which is less computationally-expensive than precise full-body mapping. Accordingly, the selection of a pre-rendered 3D model may save on time and computation relative to a full-body mapping solution. The retrieved model can be used in various applications such as clothes shopping, virtual reality, online gaming, and others.

FIG. 1 is a network diagram illustrating a network environment 100 suitable for fast 3D model fitting and anthropometrics using synthetic data, according to some example embodiments. The network environment 100 includes e-commerce servers 120 and 140, a model fitting server 130, and devices 150A, 150B, and 150C, all communicatively coupled to each other via a network 170. The devices 150A, 150B, and 150C may be collectively referred to as "devices 150," or generically referred to as a "device 150." The e-commerce servers 120 and 140 and the model fitting server 130 may be part of a network-based system 110. Alternatively, the devices 150 may connect to the model fitting server 130 directly or over a local network distinct from the network 170 used to connect to the e-commerce server 120 or 140. The e-commerce servers 120 and 140, the model fitting server 130, and the devices 150 may each be implemented in a computer system, in whole or in part, as described below with respect to FIG. 8.

The e-commerce servers 120 and 140 provide an electronic commerce application to other machines (e.g., the user devices 150) via the network 170. The e-commerce servers 120 and 140 may also be connected directly to, or integrated with, the model fitting server 130. In some example embodiments, one e-commerce server 120 and the model fitting server 130 are part of a network-based system 110, while other e-commerce servers (e.g., the e-commerce server 140) are separate from the network-based system 110. The electronic commerce application may provide a way for users to buy and sell items directly to each other, to buy from and sell to the electronic commerce application provider, or both.

The model fitting server 130 accesses pre-generated synthetic models. For example, pre-generated synthetic models may be stored on a storage device of the model fitting server 130, stored on a network storage device accessible by the model fitting server 130, or stored on a remote server accessible over the network 170. The synthetic models may be generated by the model fitting server 130 or another machine. The model fitting server 130 may provide data to other machines (e.g., the e-commerce servers 120 and 140 or the devices 150) via the network 170 or another network. The model fitting server 130 may receive data from other machines (e.g., the e-commerce servers 120 and 140 or the devices 150) via the network 170 or another network.

Also shown in FIG. 1 is a user 160. The user 160 may be a human user (e.g., a human being), a machine user (e.g., a computer configured by a software program to interact with the devices 150 and the model fitting server 130), or any suitable combination thereof (e.g., a human assisted by a machine or a machine supervised by a human). The user 160 is not part of the network environment 100, but is associated with the devices 150 and may be a user of the devices 150. For example, the device 150 may belong to the user 160 and be a sensor, a desktop computer, a vehicle computer, a tablet computer, a navigational device, a portable media device, a gaming device, a smart phone, or any other device having a sensor capable of imaging the user 160.

In some example embodiments, the model fitting server 130 receives data regarding a user. For example, a depth camera attached to the device 150A can take a depth image of the user 160 and transmit the depth image over the network 170 to the model fitting server 130. The model fitting server 130 performs closest-fit matching between the depth image of the user 160 and depth profiles of the pre-generated synthetic models. Based on the closest-fit matching, a model is selected. The model or information regarding the model can be sent to e-commerce server 120 or 140, to the device 150A, or any suitable combination thereof. The matching model can be used for fitting, virtual reality, or other applications.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 8. Moreover, any two or more of the machines, databases, or devices illustrated in FIG. 1 may be combined into a single machine, and the functions described herein for any single machine, database, or device may be subdivided among multiple machines, databases, or devices. As used herein, a "database" is a data storage resource and may store data structured as a text file, a table, a spreadsheet, a relational database (e.g., an object-relational database), a triple store, a hierarchical data store, or any suitable combination thereof.

The network 170 may be any network that enables communication between or among machines, databases, and devices (e.g., the model fitting server 130 and the devices 150). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
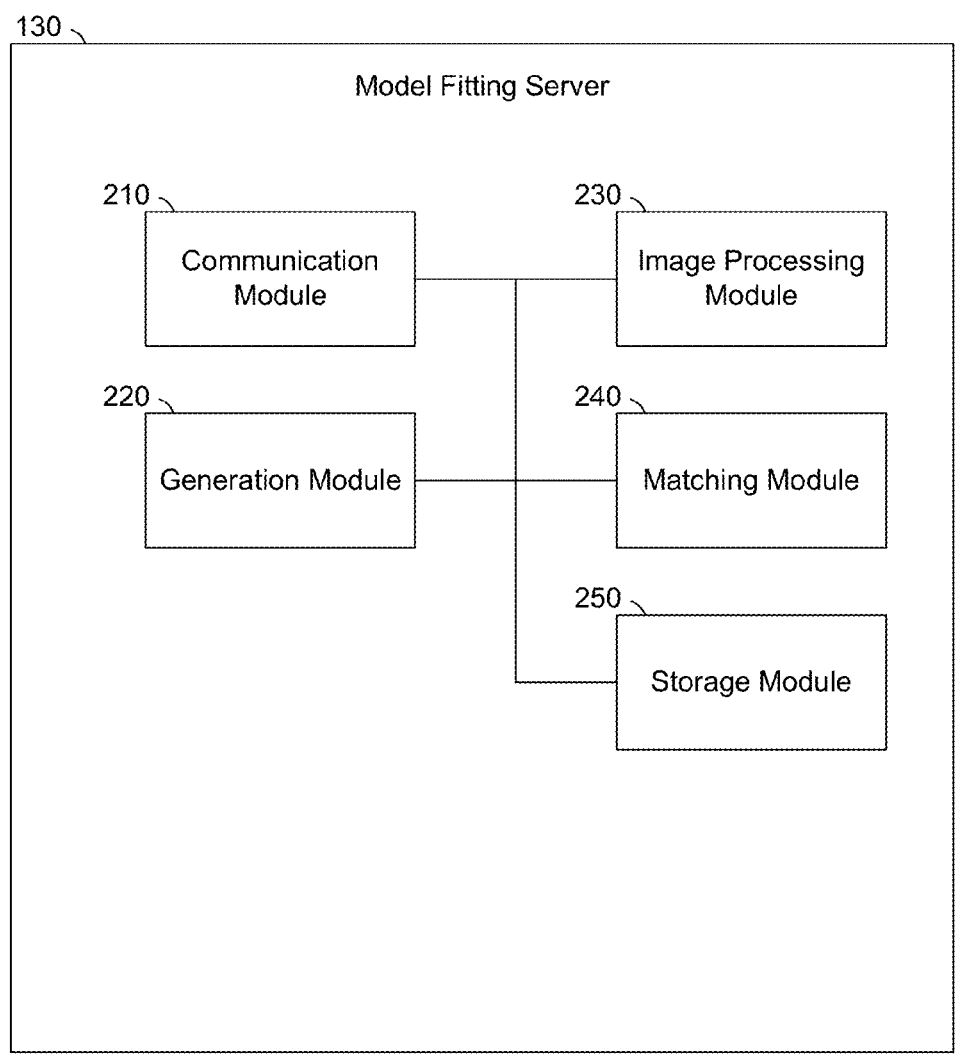
FIG. 2 is a block diagram illustrating components of a model fitting server suitable for fast 3D model fitting and anthropometrics using synthetic data, according to some example embodiments.

FIG. 2 is a block diagram illustrating components of the model fitting server 130, according to some example embodiments. The model fitting server 130 is shown as including a communication module 210, a generation module 220, an image processing module 230, a matching module 240, and a storage module 250 all configured to communicate with each other (e.g., via a bus, shared memory, or a switch). Any one or more of the modules described herein may be implemented using hardware (e.g., a dedicated hardware component) or a combination of hardware and software (e.g., a processor configured by software). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive sensor data over the network 170 and send the received data to the image processing module 230. As another example, the matching module 240 may identify a model to be used for a user, and information regarding the model may be transmitted by the communication module 210 over the network 170 to the e-commerce server 120.

The generation module 220 is configured to generate synthetic models. For example, the height and weight distributions of a population can be used to generate parameters for model creation. Those parameters can be used with a model-generating tool to generate a population of synthetic models having body shapes in a distribution that corresponds to the actual height and weight distribution of the population.

In some example embodiments, datasets comprising models generated from laser scans of bodies are used, such as the Civilian American and European Surface Anthropometry Resource project dataset from SAE International. However, when the laser scans suffer from occlusion, noise, or registration errors, the generated models are incomplete, which may hamper the performance of the system. By careful scanning from different directions and in different poses, higher-quality models can be generated, such as those in the FAUST dataset discussed in *FAUST: Dataset and evaluation for 3D mesh registration*, Bogo, et al., PROCEEDINGS IEEE CONF. ON COMPUTER VISION AND PATTERN RECOGNITION (June 2014). However, the additional care required in performing the scanning tends to limit the number of models that can efficiently be generated.

The image processing module 230 is configured to receive and process image data. Each image in the image data may be a two-dimensional image, a three-dimensional image, a depth image, an infrared image, a binocular image, or any suitable combination thereof. For example, an image may be received from a camera. The image processing module 230 may process the image data to generate a depth map of a person or object in the image.

The matching module 240 is configured to match the parameters identified by the image processing module 230 to the synthetic models generated by the generation module 220. For example, if a user reports their height and weight, and an image of the user shows the shoulder and hip width relative to the height, substantial information is present that can be used toward selecting a three-dimensional model of the user.

The storage module 250 is configured to store and retrieve data generated and used by the generation module 220, image processing module 230, and matching module 240. For example, the models generated by the generation module 220 can be stored by the storage module 250 for retrieval by the matching module 240. Information regarding a match, generated by the matching module 240, can also be stored by the storage module 250. The e-commerce server 120 or 140 can request the model for a user (e.g., by providing a user identifier) which can be retrieved from storage by the storage module 250 and sent over the network 170 using the communication module 210.

Figure 3:
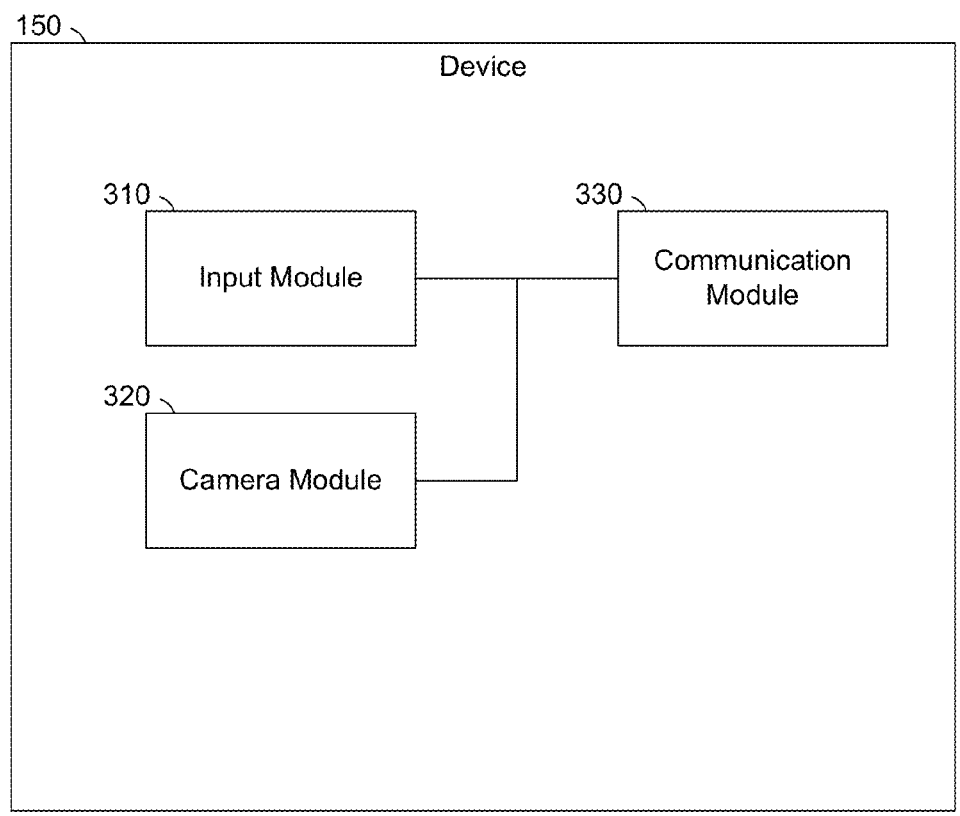
FIG. 3 is a block diagram illustrating components of a device suitable for fast 3D model fitting and anthropometrics using synthetic data, according to some example embodiments.

FIG. 3 is a block diagram illustrating components of the device 150, according to some example embodiments. The device 150 is shown as including an input module 310, a camera module 320, and a communication module 330, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input module 310 is configured to receive input from a user via a user interface. For example, the user may enter their height, weight, and gender into the input module, configure a camera, select an item to fit to a model, and so on. In some example embodiments, height, weight, and gender are automatically determined based on an image of the user, rather than explicitly entered by the user.

The camera module 320 is configured to capture image data. For example, an image may be received from a camera, a depth image may be received from an infrared camera, a pair of images may be received from a binocular camera, and so on.

The communication module 330 is configured to communicate data received by the input module 310 or the camera module 320 to the model fitting server 130. For example, the input module 310 may receive input containing the height and weight of a user and the communication module 330 may transmit the information about the user to the model fitting machine 130 to be stored in a database accessible by the matching module 240.

Figure 4:
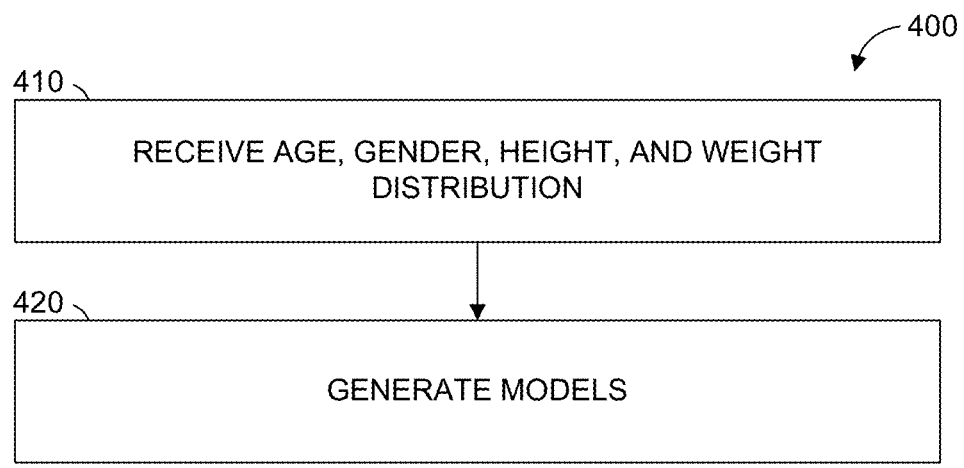
FIG. 4 is a flow diagram illustrating operations of a method for fast 3D model fitting and anthropometrics using synthetic data, according to some example embodiments.

FIG. 4 is a flowchart illustrating operations of the model fitting server 130 and the device 150 in performing a process 400 of generating synthetic models, according to some example embodiments.

In operation 410, age, gender, height and weight distributions for a population to be modelled are accessed. For example, data can be retrieved from online census data obtained from multiple populations. In some example embodiments, more or fewer distributions are accessed. For example, muscularity and ethnic origin can be considered. The distribution shown in the table below may be used. The value shown in each cell is the mean (e.g., the mean height for males aged 18-24 years is 176.7 cm) with the standard deviation following in parentheses. For example, a woman aged 30 (in the 25-44 year range) with a height of 163.5 cm is one standard deviation taller than the mean.

|       | Gender      |             |             |             |
|       | Male        |             | Female      |             |
| Age   | Height (cm) | Weight (kg) | Height (cm) | Weight (kg) |
| --- | --- | --- | --- | --- |
| 18-24 | 176.7 (0.3) | 83.4 (0.7)  | 162.8 (0.3) | 71.1 (0.9)  |
| 25-44 | 176.8 (0.3) | 87.6 (0.8)  | 163.2 (0.3) | 75.3 (1.0)  |
| 45-64 | 175.8 (0.3) | 88.8 (0.9)  | 162.3 (0.3) | 76.9 (1.1)  |
| 65-74 | 174.4 (0.3) | 87.1 (0.6)  | 160.0 (0.2) | 74.9 (0.6)  |

In operation 420, models are generated based on one or more of the accessed distributions. That is, the population of models can be generated to have distribution properties similar to those in the human population. Accordingly, more models will be generated having values near the mean and fewer models will be generated having less-common values.

Models can be generated using MakeHuman, an open-source python framework designed to prototype realistic 3D human models. MakeHuman contains a standard rigged human mesh, and can generate realistic human characters based on normalized attributes for a specific virtual character. A synthetic model can be represented by a Wavefront .obj file (3D mesh), a .skel skeleton file (Joint location), a Biovision Hierarchy .bvh (Rigged skeleton data) file, and a text file containing the attributes of age, gender, height, weight, muscle, and ethnic origin. In some example embodiments, use of this system generates a large number of realistic synthetic models with real world age, height, weight, and gender distribution in less time than models can be generated from an actual population.

Figure 5:
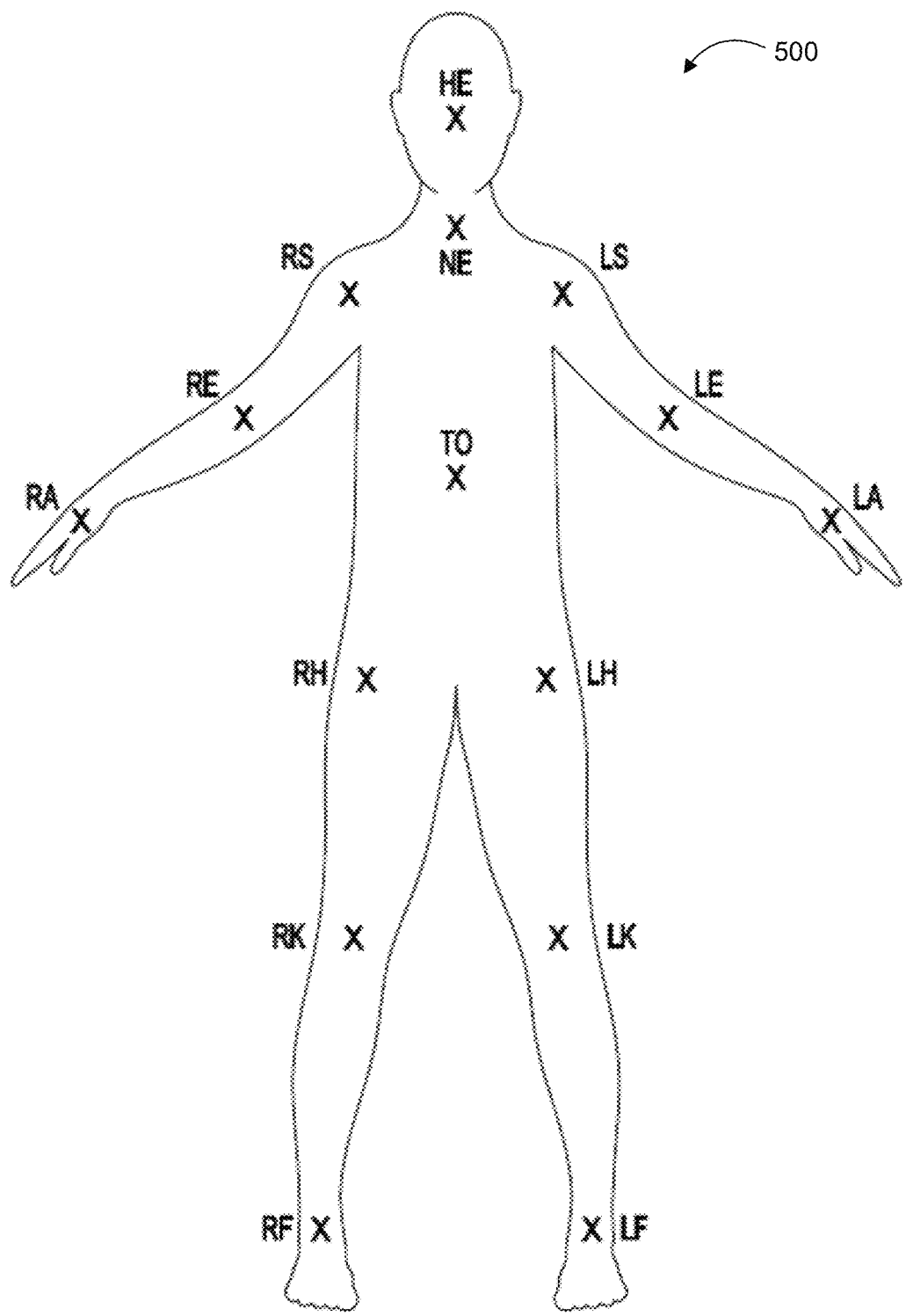
FIG. 5 is a representative diagram illustrating locations of joints in a human body model for fast 3D model fitting and anthropometrics using synthetic data, according to some example embodiments.

FIG. 5 is a representative diagram illustrating locations of joints in a human body model for fast 3D model fitting and anthropometrics using synthetic data, according to some example embodiments. As shown in FIG. 5, the human body model 500 includes 15 joints, as follows:

| Joint Label | Body Location |
|---|---|
| HE | Head |
| NE | Neck |
| TO | Torso |
| LS | Left Shoulder |
| LE | Left Elbow |
| LA | Left Hand |
| RS | Right Shoulder |
| RE | Right Elbow |
| RA | Right Hand |
| LH | Left Hip |
| LK | Left Knee |
| LF | Left Food |
| RH | Right Hip |
| RK | Right Knee |
| RF | Right Foot |

Figure 6:
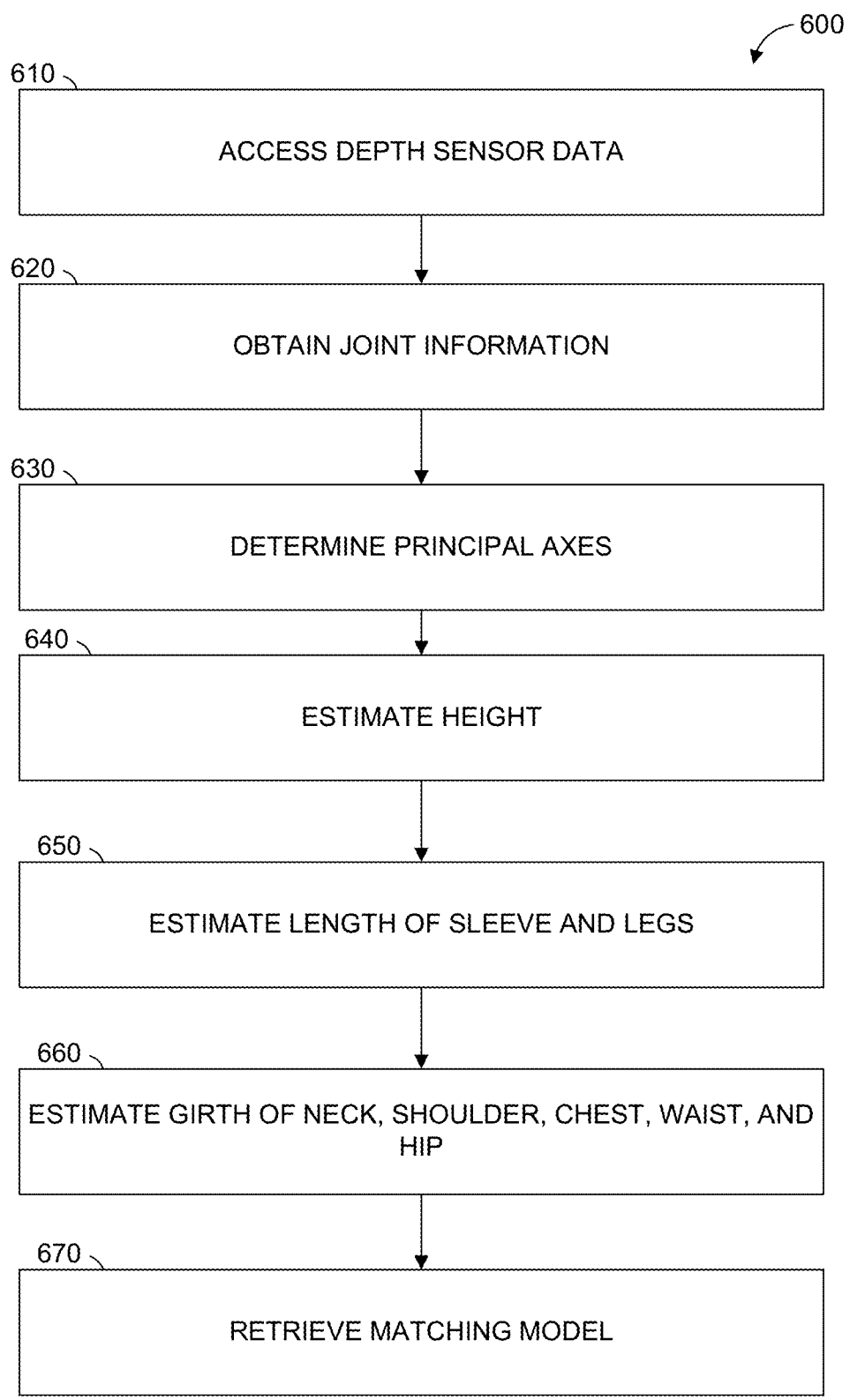
FIG. 6 is a flow diagram illustrating operations of a method for fast 3D model fitting and anthropometrics using synthetic data, according to some example embodiments.

FIG. 6 is a flowchart illustrating operations of the model fitting server 130 and the device 150 in performing a process 600 of generating synthetic models, according to some example embodiments.

In operation 610, depth sensor data is accessed by the image processing module 230. For example, the image processing module 230 can extract a human silhouette from a Kinect™ RGB-D frame (containing red, green, blue, and depth data) captured by the camera module 320 and turn it into a 3D pointcloud.

The image processing module 230 can obtain joint locations in operation 620 by using OpenNI, which provides a binary segmentation mask of the person, along with skeletal keypoints corresponding to different body joints. In OpenNI, there are 15 joint positions in 3D real world coordinates, as shown in FIG. 5. The 3D positions of the joints can be converted to 2D coordinates on the imaging plane by projection.

The principal axes of the user are defined in operation 630. The principal axes can be defined as $\{u, v, w\}$, where $$u = \frac{\overrightarrow{(NE, TO)}}{\|\overrightarrow{NE, TO}\|}, \quad V = \frac{\overrightarrow{(LS, RS)}}{\|\overrightarrow{LS, RS}\|}, \quad W = u \times v.$$

That is, u is the vector from the neck joint to the torso joint, normalized by the length of the vector, v is the vector from the left shoulder to the right shoulder, normalized by the length of that vector, and w is the cross product of u and v.

Thus, for a user standing straight and directly facing the camera, the u vector will point down, the v vector will point from the left side to the right side of the user's body, and the w vector will point out from the user toward the camera.

In some example embodiments, a check is made that the user is standing nearly straight. For example, the equation below can be used to measure the degree to which the u vector is parallel to a line drawn from the torso joint to the point directly between the two shoulder joints.

$$\frac{u \cdot \overrightarrow{\left(TO, \frac{LH+RH}{2}\right)}}{\left\|\overrightarrow{\left(TO, \frac{LH+RH}{2}\right)}\right\|} < \varepsilon_1$$

If the value of the left side of the equation exceeds a threshold, $\varepsilon_1$, then the user can be prompted to pose again. In some example embodiments, a value of 0.1 for $\varepsilon_1$ is used.

In operation 640, the height is estimated. For example, a contour of the segmented two-dimensional silhouette of the user can be extracted by thresholding the depth map and projecting it onto a two-dimensional plane defined by u and v. Then, the points on the contour that satisfy $$\frac{|v \cdot \overrightarrow{(TO, P_c)}|}{\|\overrightarrow{(TO, P_c)}\|} < \varepsilon_2$$

are selected. $P_c$ is an arbitrary point on the contour and $\varepsilon_2$ is a threshold (e.g., 0.1). The resulting points are within the contour and lie approximately on u. These points are sorted vertically, and the top and bottom points found. The top and bottom points can be converted back to 3D real-world coordinates and the estimated height calculated as the Euclidean distance between the two points.

The length of the sleeve and legs are estimated in operation 650. For example, using 3D real-world coordinates, the sleeve length can be calculated as the average of $$\|\overrightarrow{(LA, LE)}\| + \|\overrightarrow{(LE, LS)}\| + \|\overrightarrow{(LS, NE)}\| \text{ and}$$

$$\|\overrightarrow{(RA, RE)}\| + \|\overrightarrow{(RE, RS)}\| + \|\overrightarrow{(RS, NE)}\|.$$

Similarly, the length of the legs can be estimated as the average of $$\|\overrightarrow{(LH, LK)}\| + \|\overrightarrow{(LK, LF)}\| \text{ and}$$

$$\|\overrightarrow{(RH, RK)}\| + \|\overrightarrow{(RK, RF)}\|.$$

In operation 660, the girth of neck, shoulder, chest, waist, and hip are estimated. To get estimates of neck, shoulder, chest, waist and hip girth, the image processing module 230 first defines a 3D point x, and then computes the intersection between the 3D point cloud and the plane passing through x and perpendicular to u. Since the joints tracked by OpenNI are designed to be useful for interactive games, rather than being anatomically precise, some adjustments are made to the raw joint locations reported by OpenNI to place them closer to the actual anatomical positions. New joint locations may be defined according to the equations below.

$$x_{neck} = \frac{NE + HE}{2}$$

-continued $$x_{shoulder} = \frac{\left(x_{neck} + \frac{LS + RS}{2}\right)}{2}$$

$$x_{chest} = \frac{NE + TO}{2}$$

$$x_{waist} = TO$$

$$x_{hip} = \frac{LH + RH}{2}$$

When a single depth channel of a single image is used, only a frontal view of the user is available. To generate a 3D view, an ellipse is fitted to the points on one or more cross-section planes to obtain full-body measurements. Ellipse fitting can also be used when multiple images are available. The points for each ellipse can be defined as the set of points p in the point cloud, wherein the vertical distance of the point from x is less than a threshold. Or in mathematical terms:

$$\left\{ p \in \text{Point Cloud, s.t. } \left| \frac{(x-p) \cdot u}{\|x-p\|} \right| < \varepsilon_3 \right\}$$

The threshold, $\varepsilon_3$, is a small positive fraction (e.g., 0.1). In some example embodiments, the measurements are estimated in real time.

The matching module 240 retrieves the model that best matches the user data in operation 670. A feature vector can be used to perform comparisons between the user data and the set of models (e.g., the set of models generated in operation 420). For example, a feature vector can be divided into three groups of features with different weights: global body shape, gender, and local body shape.

The global body shape features can include height, length of sleeve, length of leg, and shoulder width. These features reflect the longer dimensions of the human body.

The gender features can include two ratios, as follows.

$$ratio_1 = \frac{\|\overline{Chest}\|}{\|Chest\|}$$

$$ratio_2 = \frac{Hip}{Waist}$$

$ratio_1$ is the ratio of the 3D surface distance around the chest to the Euclidean distance between the left shoulder joint and the right shoulder joint. All else being equal, $ratio_1$ tends to be larger for females and smaller for males. $ratio_2$ is the ratio between hip and waist size, taken either three-dimensionally or two-dimensionally. All else being equal, $ratio_2$ also tends to be larger for females and smaller for males.

The local body shape features group includes one element for each locally computed point. For example, fast point feature histograms (FPFH), as described in *Fast point feature histograms (fpfh) for 3d registration*, Rusu et al., ROBOTICS AND AUTOMATION 3212-3217 (May 2009), can be calculated at 33 points around each of the 15 joints with a search radius of 20 centimeters. In this example, 495 features are in the local body shape features group.

Once the feature vector is created, a nearest neighbor search can be performed by the matching module 230 to find the closest match in the synthetic dataset. In an example embodiment, the size of the feature vector dataset for 50,000 synthetic models is roughly 25 MB, and a single query takes about 800 ms to complete on a 2.26 GHz Intel Xeon E5507 machine.

The matching model can be used for any of a variety of purposes. For example, a size fitting chart can be accessed that indicates which particular body measurement or set of body measurements corresponds to a particular size of a piece of clothing. By reading the appropriate body measurements from the model, the correct size of the clothing for the user can be determined. As another example, if the measurements of the clothing are known, then a model of the clothing can be generated and rendered on top of the matching model at the correct scale, allowing the user to see how the clothing will fit. As another example, the matching model can be placed in a game or virtual reality environment, to represent the user.

Figure 7:
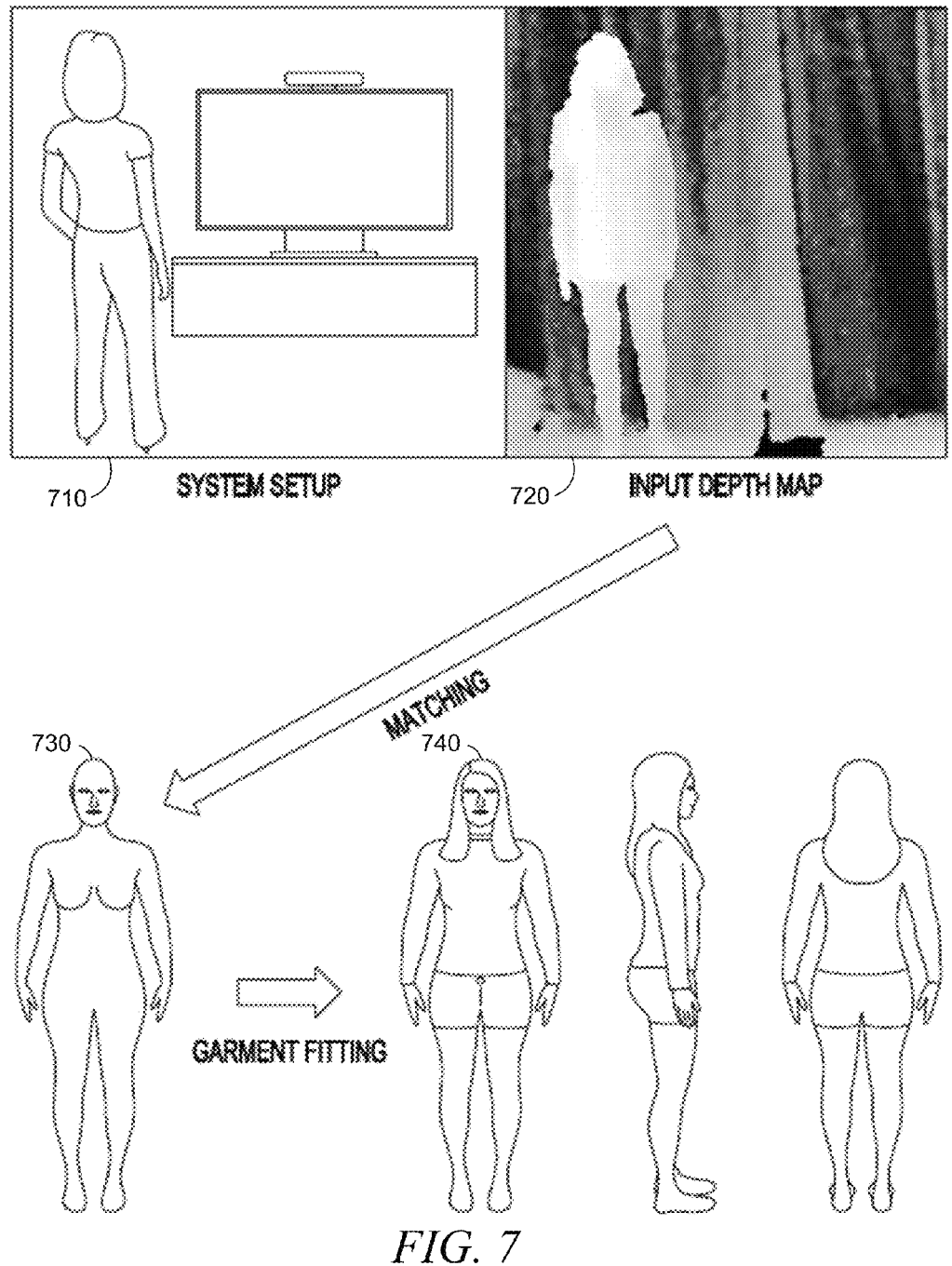
FIG. 7 is a flow diagram pictorially illustrating a method for fast 3D model fitting and anthropometrics using synthetic data, according to some example embodiments.

FIG. 7 is a flow diagram pictorially illustrating a method for fast 3D model fitting and anthropometrics using synthetic data, according to some example embodiments. Image 710 depicts the user setting up an image capture system, such as the device 150. The image capture system captures an image of the user that includes depth data, as shown in the image 720. In the example image shown, the user appears in lighter grays than the background because the user is closer to the camera. Based on the depth data, a matching model is identified, such as the reconstructed 3D model 730. Using the model data and the size data for garments, garments are fitted and modeled on the body, resulting in the dressed model 740.

Figure 8:
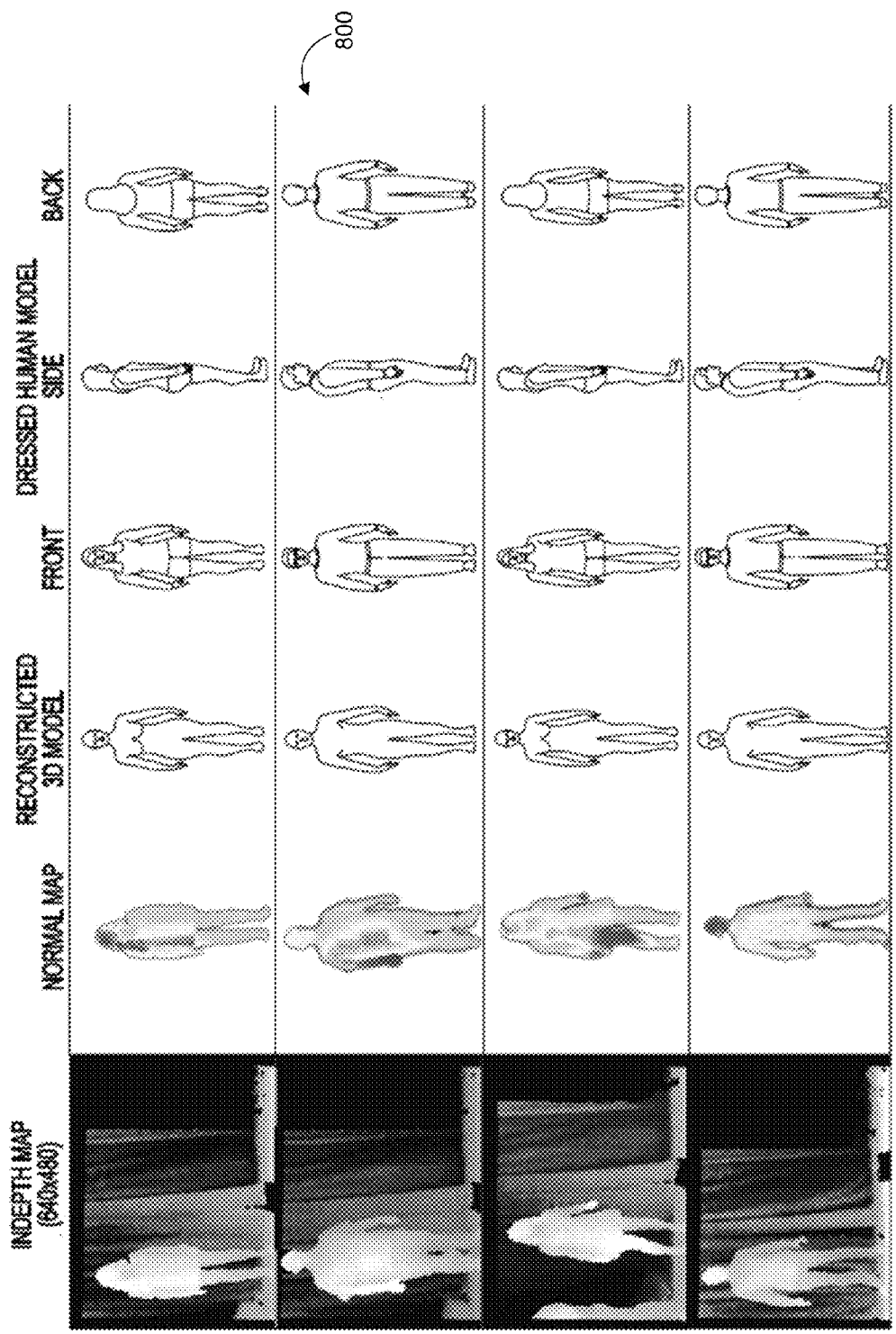
FIG. 8 is a table illustrating results of a method for fast 3D model fitting and anthropometrics using synthetic data, according to some example embodiments.

FIG. 8 is a table 800 illustrating results of a method for fast 3D model fitting and anthropometrics using synthetic data, according to some example embodiments. Each row of the table 800 shows an input depth map, a normal depth map generated from the input depth map, a selected 3D model selected from a set of pregenerated synthetic models based on the normalized depth map, and a dressed human model based on the selected 3D model and sizing information for the displayed garments. A normal depth map is a representation of a depth map in which the surface normal (i.e., the direction of the object represented relative to the camera) of each pixel is represented according to a color code.

According to various example embodiments, one or more of the methodologies described herein may facilitate determining a 3D model for a user. Moreover, one or more of the methodologies described herein may facilitate determining the 3D model for the user without dynamically generating the 3D model. Furthermore, one or more of the methodologies described herein may facilitate the selection of a 3D model for the user more quickly and with a lower use of computational power compared to previous methods.

When these effects are considered in aggregate, one or more of the methodologies described herein may obviate a need for certain efforts or resources that otherwise would be involved in generating or selecting a model representing a user. Efforts expended by a user in ordering items of interest may also be reduced by one or more of the methodologies described herein. For example, accurately selecting models from a pregenerated set may enable a user to see the actual fit of an item more quickly compared to the use of a model specifically generated for the user and more accurately compared to a guess of size by the user without the aid of a model. Computing resources used by one or more machines, databases, or devices (e.g., within the network environment 100) may similarly be reduced. Examples of such computing resources include processor cycles, network traffic, memory usage, data storage capacity, power consumption, and cooling capacity. Similarly, machines exist to provide 3D models that correspond to users and the systems and methods presented herein are an improvement to the technology for providing 3D models that correspond to the users.

FIG. 9 is a block diagram illustrating database structures for fast 3D model fitting and anthropometrics using synthetic data, according to some example embodiments. The database 900 includes user table 910, model table 920, and item table 930. In some example embodiments, additional or fewer elements may be used in each of the tables 910-930.

The user table 910 includes a user identifier ("ID") that uniquely identifies each user, along with height, weight, and gender for the user. As described above with respect to FIGS. 6-8, the information about the user can be used to identify a 3D model to use for the user. A reference to the model table 920 for the 3D model can be stored in the model ID field for the user. In some example embodiments, the user information such as height, weight, and gender is used to determine the model ID, but then discarded and not stored in the user table 910. In some example embodiments, additional user data fields related to the physical body of the user are stored, such as girth and width measurements (e.g., chest width and chest circumference), and one or more body measurement ratios of the user. In some example embodiments, additional user data is stored such as name, address, email address, and preferences.

The model table 920 includes a model ID that uniquely identifies each model, along with height, weight, and gender for the model. The model table 920 also includes 3D model data for each model. For example, a data representation of a mesh of the model may be stored directly in the model table 920 or a file name containing the data may be stored. In some example embodiments, additional data used in the generation of the model is stored in the model table 920, such as girth and width values and body measurement ratios of the model.

The item table 930 includes an item ID that uniquely identifies each item (e.g., a clothing item), along with images of the item, a description of the item, and 3D model data for the item. In some example embodiments, fewer fields are stored in the item table 930. For example, when the 3D model data is present, images of the item can be generated dynamically from the 3D model data. As another example, measurement information may be present, allowing the 3D model data to be generated dynamically from the measurement information and the images of the item.

Figure 10:
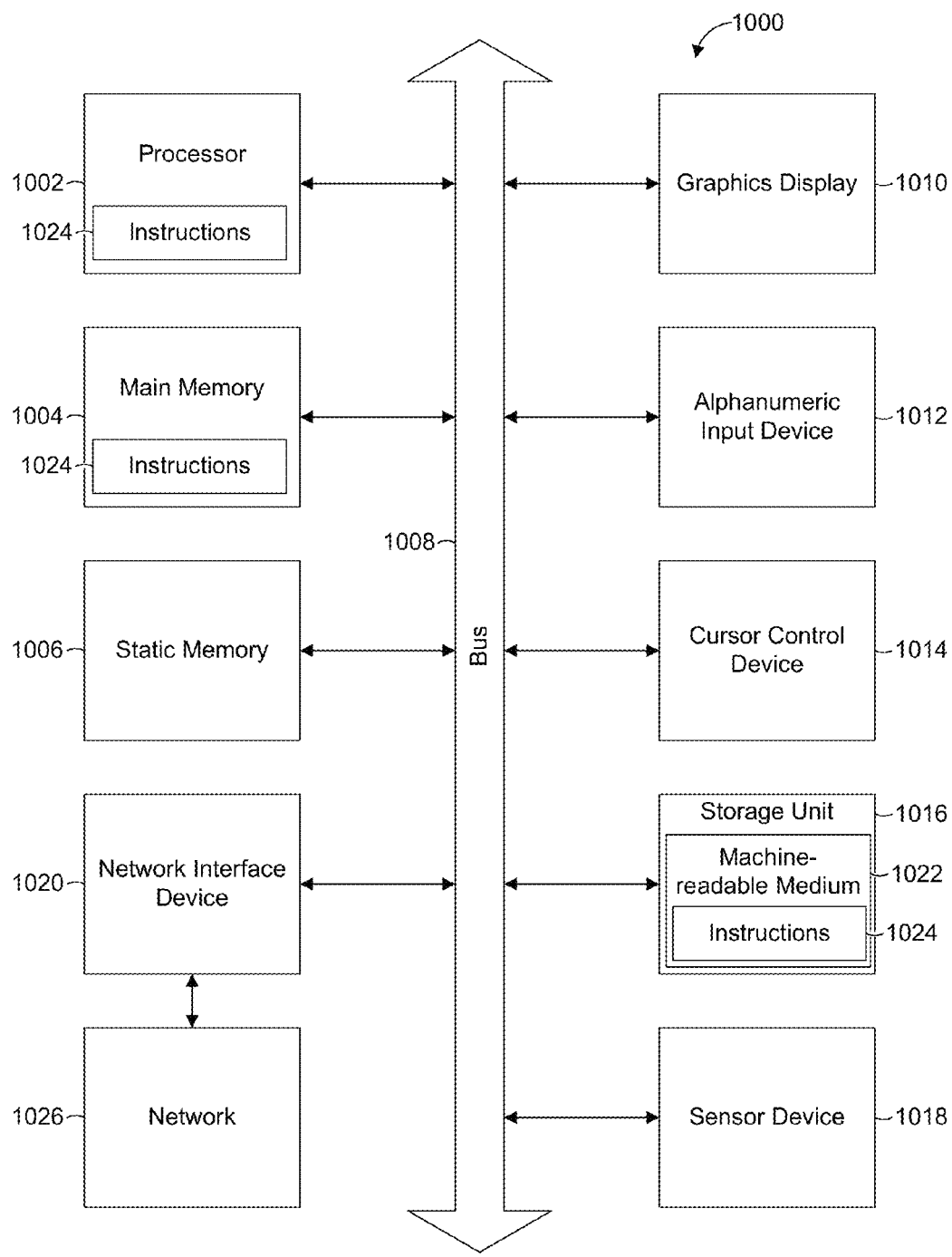
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. The machine 1000 may be used to implement the e-commerce servers 120 and 140, the model fitting server 130, and the devices 150. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 170) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    accessing an image of a user;
    based on the image of the user, determining a physical attribute of the user by a processor of a machine;
    selecting a model from a set of models, based on a match between the physical attribute of the user and a corresponding attribute of the model; and
    causing presentation of the selected model on a display device;
    wherein the match between the physical attribute of the user and the corresponding attribute of the model is found as part of a comparison of a feature vector of the user and a feature vector of the model, each of the feature vectors including a height value, a weight value, and a gender value;
    receiving a selection of an item of clothing from the user;
    wherein the causing of the presentation of the selected model on the display device comprises presenting a representation of the selected model wearing the item of clothing on the display device.

2. The method of claim 1, further comprising synthesizing the set of models based on a population distribution of an attribute.

3. The method of claim 2, wherein the population distribution of the attribute includes a mean and a standard deviation of the attribute for each gender.

4. The method of claim 1, wherein each of the feature vectors further includes a girth of neck value, a girth of shoulder value, a girth of chest value, a girth of waist value, and a girth of hip value.

5. The method of claim 1, wherein:
    the image of the user comprises a depth map; and
    the determining of the physical attribute of the user is based on the depth map.

6. The method of claim 1, wherein the determining of the physical attribute of the user comprises determining principal axes of the user.

7. The method of claim 1, further comprising:
    determining a size for the item of clothing based on the selected model.

8. The method of claim 7, further comprising:
    generating the representation of the model wearing the item of clothing based on the size of the item of clothing.

9. A system comprising:
    one or more processors configured to perform operations comprising:
        accessing an image of a user;
        based on the image of the user, determining a physical attribute of the user;
        selecting a model from a set of models, based on a match between the physical attribute of the user and a corresponding attribute of the model; and
        causing presentation of the selected model on a display device;
        wherein the match between the physical attribute of the user and the corresponding attribute of the model is found as part of a comparison of a feature vector of the user and a feature vector of the model, each of the feature vectors including a height value, a weight value, and a gender value;
        receiving a selection of an item of clothing from the user;
        wherein the causing of the presentation of the selected model on the display device comprises presenting a representation of the selected model wearing the item of clothing on the display device.

10. The system of claim 9, wherein the operations further comprise:
    synthesizing the set of models based on a population distribution of an attribute.

11. The system of claim 10, wherein the population distribution of the attribute includes a mean and a standard deviation of the attribute for each gender.

12. The system of claim 9, wherein each of the feature vectors further includes a girth of neck value, a girth of shoulder value, a girth of chest value, a girth of waist value, and a girth of hip value.

13. The system of claim 9, wherein:
    the image of the user comprises a depth map; and
    the determining of the physical attribute of the user is based on the depth map.

14. The system of claim 9, wherein the determining of the physical attribute of the user comprises determining principal axes of the user.

15. The system of claim 9, wherein the operations further comprise:
    determining a size for the item of clothing based on the selected model.

16. The system of claim 15, wherein the operations further comprise:
    generating the representation of the model wearing the item of clothing based on the size of the item of clothing.

17. A non-transitory machine-readable medium having instructions embodied thereon, the instructions executable by a processor of a machine to perform operations comprising:
    accessing an image of a user;
    based on the image of the user, determining a physical attribute of the user;
    selecting a model from a set of models, based on a match between the physical attribute of the user and a corresponding attribute of the model; and
    causing presentation of the selected model on a display device;
    wherein the match between the physical attribute of the user and the corresponding attribute of the model is found as part of a comparison of a feature vector of the user and a feature vector of the model, each of the feature vectors including a height value, a weight value, and a gender value;

receiving a selection of an item of clothing from the user; and wherein the causing of the presentation of the selected model on the display device comprises presenting a representation of the selected model wearing the item of clothing on the display device.

18. The non-transitory machine-readable medium of claim 17, wherein the operations further comprise synthesizing the set of models based on a population distribution of an attribute.

* * * * *